Dec. 8, 1959  G. H. BROWN ET AL  2,915,943
METHOD AND APPARATUS FOR DISPLACING A LIGHT BEAM
Filed Aug. 30, 1955
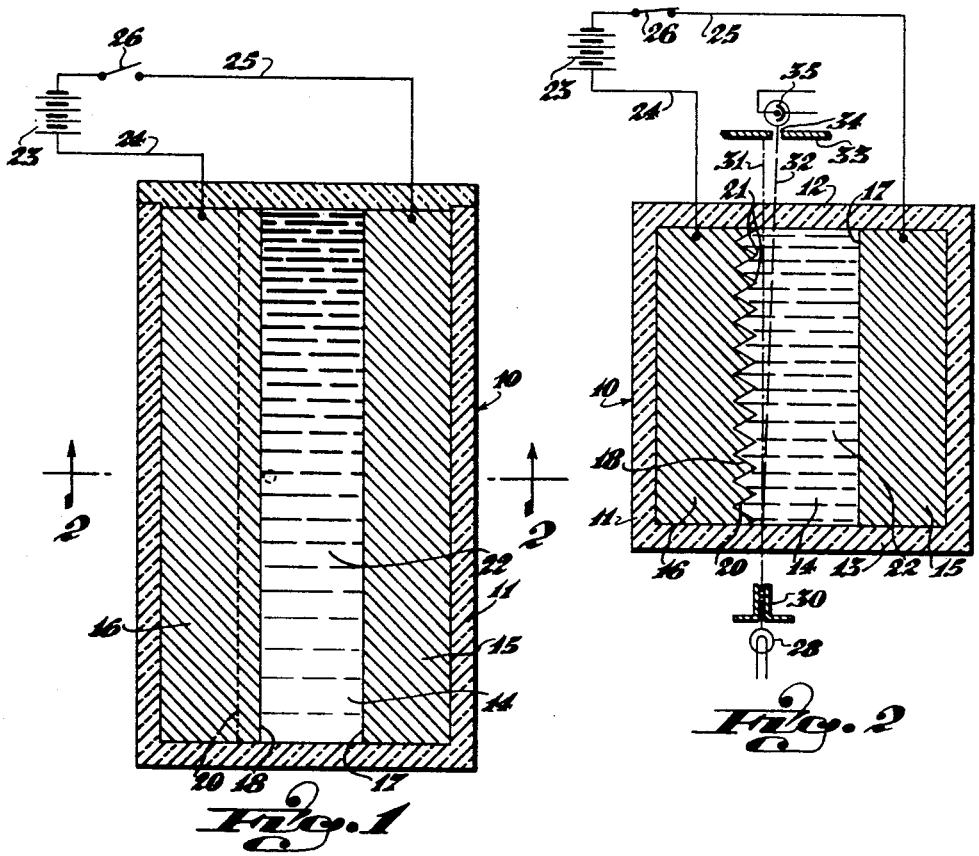
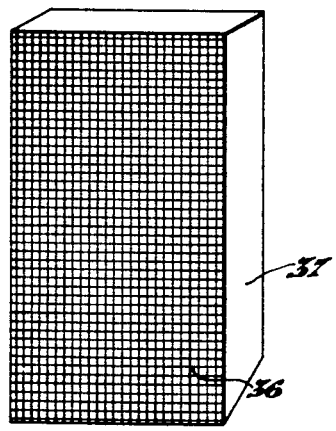
INVENTORS
Glenn H. Brown
John H. Dreger
Hyman R. Lubowitz
William F. H. Middendorf
BY Wood, Herron & Evans
ATTORNEYS

United States Patent Office 2,915,943
Patented Dec. 8, 1959

2,915,943

METHOD AND APPARATUS FOR DISPLACING A LIGHT BEAM

Glenn H. Brown, John F. Dreyer, and Hyman R. Lubowitz, Cincinnati, Ohio, and William H. H. Middendorf, Covington, Ky., assignors to University of Cincinnati Research Foundation, a non-profit corporation of Ohio Application August 30, 1955, Serial No. 531,482

7 Claims. (Cl. 88—61)

This invention relates to optical devices and is particularly directed to novel electro-optical apparatus for displacing a beam of light in response to the application of an electric field to a liquid dielectric medium through which the beam of light is passed.

The present invention is predicated upon the emperical discovery and determination that if a beam of light is passed through a dielectric liquid, intermediate two electrodes, immersed in the liquid, and an electric potential is applied to the electrodes, the light beam is shifted from its path in a direction away from the adjacent electrode. One suitable form of apparatus for producing this light shift includes a container housing two electrodes immersed in a dielectric liquid such as para tolyl acetate. The electrodes have opposed faces extending in spaced parallel relationship with one another. A source of electrical potential is provided for applying either a direct or alternating voltage of the order of several thousand volts to the electrodes creating an electric field in the dielectric liquid confined between the electrodes. If a collimated light beam is passed through the dielectric liquid in close proximity to one of the electrode faces, when no potential is applied to the electrodes, the light beam passes straight through the dielectric in the normal manner. However, when a potential is applied to the electrodes, the light beam is shifted away from the adjacent electrode toward the opposite electrode.

We have further observed that the magnitude of the light shift varies with different dielectrics. The amount of shift is also affected by the purity of the dielectric, the magnitude of the field gradient, and the homogeneity of the electric field. The experimental evidence now available suggests that maximum shift is obtained by producing in a pure dielectric liquid a non-homogeneous field having a voltage gradient of the order of 1000 volts per millimeter, and passing a light beam very close to an irregularly shaped electrode immersed in the dielectric so that the light beam passes through the regions of high voltage gradient.

No previously proposed scientific theory satisfactorily explains this shift phenomenon. However, we have hypothesized that a liquid dielectric is not a truly homogeneous liquid comprising only single molecules; rather experimental evidence suggests that such liquid also includes elongated swarms of molecules known as cybotactic groups. These groups, which are continuously associating and disassociating, are substantially larger than a single molecule. Each group, or swarm, forms an electrical dipole which renders the group more readily influenced by an electrical field.

We have hypothesized that because of this dipole, a cybotactic group tends to become oriented in the presence of a relatively strong electric field. Furthermore, we believe that these groups tend to concentrate in areas of the field having a high voltage gradient, such as the areas adjacent to irregular electrode surfaces. These groups have a different optical density than the remainder of the liquid. In our opinion, it is these phenomena which affect the light transmitting properties of the dielectric liquid to produce the shift that we have observed. This theory provides an explanation as to why a substantially larger shift is observed when an irregular electrode surface is employed in place of a smooth one; and why a greater shift is observed when the light beam is originally directed adjacent to the electrode surface rather than in the center of the liquid between the two electrodes.

However, because of the incomplete experimental evidence now available, it is not possible at the present time to formulate a general rule for predicting which dielectrics will provide the greatest amount of shift. Nor is it possible to accurately predict the effect of impurities, mixtures and the like. Consequently, in advance of exhaustive research, which would require many years, it is not possible to predict in advance the behavior of individual dielectrics chemically pure or otherwise. However, the following detailed description of the drawings include a list of several dielectric liquids which are suitable for producing a light shift of useable magnitude, and other suitable dielectrics can be identified by experimentation.

The present invention is not limited to the academic discovery that a light beam may be shifted in the manner described. Rather, it also comprehends the determination that if the dielectric in properly chosen, and is used in conjunction with advantageously configurated electrodes, having an electrical potential of the proper magnitude applied to them, a light beam can be shifted a sufficient distance to be put to highly useful purposes.

For example, if a planar electrode and an electrode having a corrugated face are immersed in para tolyl acetate so that the opposing electrode faces are spaced from four to six millimeters apart, and a potential of 4000 volts is applied to across the electrodes, a collimated light beam which passes adjacent to the surface of the corrugated electrode when no voltage is applied will be shifted approximately one-fourth of an inch in twenty inches of travel when the electrodes are energized. A device for producing the light shift can be utilized in conjunction with a photoelectric cell as a control element in computers, electronic organs, and the like. Also, by aligning an aperture in a wall so that it is disposed in registry with the position of the light beam when the electrodes are energized, the present light shifter can be employed as a shutter adapted to permit the passage of light only when the electrodes are energized.

One of the principal advantages of the present light shifting apparatus is that it has no moving parts. Hence, the device can be used for long periods without requiring any repair or servicing. This renders it particularly adapted for installation in relatively inaccessible locations.

Moreover, the light shifting apparatus can be made extremely compact since it completely eliminates the need for cumbersome solenoids, mechanical levers and the like.

A further advantage of the present light valve is that it provides a very high ratio of light transmission to light cut off. That is, a light beam can be shifted a sufficient distance so that a photocell, or other target which is illuminated when the light beam is in its shifted position receives no light when the light beam is in its unshifted position. Additionally, the present apparatus is advantageous in that it absorbs a very small amount of the light passing through it.

A still further advantage of the present light shifter is that it is operated by a high voltage and extremely small current so that several light valves can be connected in parallel and operated together or in sequence from the same voltage supply.

These and other advantages of the present invention will be more readily apparent from a further consideration of the following detailed description of the drawings illustrating a preferred embodiment of the invention.

In the drawings:

Figure 1 is an enlarged cross sectional view of a light shifting device constructed in accordance with the present invention.

Figure 2 is a cross sectional view taken along line 2—2 of Figure 1.

Figure 3 is a perspective view of a modified form of electrode.

One suitable form of light shifting device 10, as shown in Figures 1 and 2, includes a housing 11. This housing may be formed of any suitable non-conducting material such as plastic, glass or the like, and includes two oppositely disposed walls 12 and 13 formed at least in part of transparent material. In one preferred embodiment, the entire housing is formed of a transparent plastic such as Lucite, the walls of which are molded or are secured together in any suitable manner such as by means of an adhesive, so that a fluid tight chamber 14 is formed within the interior of the housing. Two electrodes 15 and 16, formed of copper, brass or other suitable conductive material such as Nesa glass, are disposed within the housing in spaced relationship with one another. The electrodes are provided with opposed faces 17 and 18 which are separated by a distance preferably of the order of four to six millimeters, although this spacing is not critical, nor is the length of the electrodes along the light path critical; although we have determined that for an appreciable shift the electrodes should be at least three centimeters in length.

In the embodiment shown, face 17 of electrode 15 is planar while face 18 of electrode 16 is of an irregular configuration including a plurality of vertically extending V-shaped grooves 20. It has been empirically observed that a maximum light shift is obtained when electrode 16 is shaped so that adjacent ridges 21 are spaced approximately one-sixteenth to one-eighth of an inch apart. These electrodes extend completely across the housing into substantially fluid tight engagement with walls 12 and 13 so that the dielectric liquid 22 is confined between transparent end walls 12 and 13 and the electrodes.

Electrodes 15 and 16 are connected to a voltage source 23 through leads 24 and 25 and switch 26. While voltage source 23 has been indicated as being constituted by a battery, any source of relatively high voltage alternating current or direct current may be employed. While the exact potential produced by source 23 is not critical; for an electrode spacing of from 4–6 millimeters, a potential of the order of 4000 volts provides optimum results. There is a lower limit, or threshold, voltage around 1500 volts below which the device will not function to provide any appreciable shift in the light beam and above 5000 volts any increase in the applied voltage does not increase the shift of the light beam.

Among the liquid dielectrics which have been employed to produce this light shift, are:

Para tolyl acetate
Normal amyl acetate
Nitrobenzene
Secondary butyl alcohol
Carbon disulfide
Chloroform Absolute ethyl alcohol
Ethyl acetate
Tertiary amyl alcohol
Absolute methyl alcohol
Ethyl cinnamate These liquids are listed in the approximate order of magnitude of the shift produced within them. In the absence of a completely satisfactory theory, for predicting behavior of individual dielectrics chemically pure or otherwise, if it is desired to use a dielectric not included in the above list, such dielectric must be tested to ascertain whether or not it produces a shift of useable magnitude.

In general, available experimental evidence indicates that the liquid dielectrics which provide a shift of some magnitude comprise crude and refined mineral oils, animal and vegetable oils, organic acids, esters, alcohols, ketones, coal tar derivatives, silicones and the like; that is, organic substances generally which exhibit dielectric properties. In addition, mixtures of these dielectrics have been found to provide the shift herein disclosed. It would appear on the basis of the experimental evidence presently available, that the amount of shift produced in a given dielectric increases as the purity of the dielectric is increased.

Figure 2 shows a typical installation in which a light shifter 10 is disposed in the path of a beam of light from light source 28 and collimating tube 30 so that the beam passes through the dielectric adjacent to electrode 16. So long as switch 26 is open and no potential is applied across electrodes 15 and 16, the light beam passes in a straight line through the dielectric liquid as indicated by line 31. However, when switch 26 is closed, and a potential is applied across the electrodes 15 and 16 forming an electric field in the dielectric liquid, the light beam is displaced away from the adjacent electrode as indicated by line 32. This displacement is slightly exaggerated in Figure 2 for purposes of illustration, and for the embodiment described is of the order of one-fourth inch in twenty inches of light travel. The displacement is always in the same direction, away from the adjacent electrode whether electrodes are energized as shown, or whether the polarity is reversed or alternated.

A shield 33 provided with an aperture 34 is placed on the side of housing 11 remote from the light source. The shield is aligned so that aperture 34 is in registry with the light beam in its shifted position. A photoelectric cell 35 is placed behind aperture 34 and is adapted for energization by light passing through the aperture. When switch 26 is open, the light beam 31 strikes the shield and the photocell is not energized. However, when switch 26 is closed, the light beam is shifted to strike the photocell, energizing a secondary circuit containing the photocell.

While the electrode configurations shown in Figures 1 and 2 produce an optimum amount of light shift, other electrode configurations can be used. For example, a small shift can be obtained from two smooth flat electrode surfaces. A somewhat greater shift is obtained by using a screen electrode of the type shown in Figure 3, in which a screen section 36 is carried on the surface of a strip of insulating material 37. It is preferable that the electrode or the electrode and its backing member should be imperforate. This minimizes the flow and turbulence in the dielectric liquid, preventing erratic shifting of the light beam. Those skilled in the art can be routine experimentation determine other suitable electrode configurations for a particular installation.

Having described our invention, we claim:

1. Apparatus for shifting a beam of light comprising a housing, a body of dielectric liquid disposed within said housing, two electrodes mounted within said housing and immersed in said dielectric liquid, said electrodes having spaced, opposed faces, means for applying a high voltage electrical potential across said electrodes so that an electrical field is established in the dielectric liquid and the optical density of the dielectric liquid adjacent to said electrode faces is altered, means for projecting a beam of light between the electrode faces closely adjacent to one of said electrode faces and spaced a substantially greater distance from the other of said electrode faces, whereby the beam of light is shifted in a plane transverse to the electrode faces and parallel to the electrical field in response to the application of said electrical potential.

2. Apparatus for shifting a beam of light comprising a housing, a body of dielectric liquid disposed within said housing, two electrodes mounted within said housing and immersed in said dielectric liquid, said electrodes having spaced, opposed faces, means for applying a high voltage electrical potential across said electrodes so that an electrical field is established in the dielectric liquid and the optical density of the dielectric liquid adjacent to said electrode surfaces is altered, means for projecting a beam of light between the electrode faces closely adjacent to one of said electrode faces and spaced a substantially greater distance from the other of said electrode faces whereby the beam of light is shifted in a plane transverse to the electrode faces and parallel to the electrical field in response to the application of said electrical potential, and light responsive means disposed in registry with the position of the light beam in its shifted position.

3. Apparatus for shifting a beam of light comprising a housing, a body of dielectric liquid disposed within said housing, two electrodes disposed within said housing, said electrodes being immersed in said dielectric liquid and having spaced, opposed faces, the face of one of said electrodes being of irregular, non-planar configuration, means for selectively applying a high voltage electrical potential across said electrodes whereby an electrical field is established in the dielectric liquid, and means for projecting a beam of light between the electrode faces closely adjacent to one of said electrode faces and spaced a substantially greater distance from the other of said electrode faces, whereby the beam of light passing between the electrodes will be shifted in a plane transverse to the electrode faces and parallel to the electrical field in response to the application of said potential.

4. Apparatus for shifting a beam of light comprising a housing, a body of dielectric liquid disposed within said housing, two electrodes disposed within said housing, said electrodes being immersed in said dielectric liquid and having spaced, opposed faces, the face of one of said electrodes having a plurality of parallel grooves formed therein, means for selectively applying a high voltage electrical potential across said electrodes whereby an electrical field is established in the dielectric liquid, and means for projecting a beam of light between the electrode faces closely adjacent to one of said electrode faces and spaced a substantially greater distance from the other of said electrode faces, whereby the beam of light passing between the electrodes will be shifted in a plane transverse to the electrode faces and parallel to the electrical field in response to the application of said potential.

5. Apparatus for shifting a beam of light comprising a housing, a body of dielectric liquid disposed within said housing, two electrodes disposed within said housing, said electrodes being immersed in said dielectric liquid and having opposed faces, means for projecting a beam of light between said faces closely adjacent to one of said faces and spaced a substantially greater distance from the other of said faces, said faces extending at least three centimeters in the direction of light travel and being spaced from one another a distance of the order of five millimeters, and means for selectively applying a potential of the order of several thousand volts across said electrodes whereby an electrical field is established in the dielectric liquid and the optical density of the dielectric liquid adjacent to said electrode faces is altered to deviate the light beam whereby the light beam passing between said electrodes is shifted in a plane transverse to the electrode faces and parallel to the electrical field in response to the application of said electrical potential.

6. A method of displacing a light beam in a predetermined direction, said method comprising the steps of disposing two electrodes in spaced relationship in a dielectric liquid, passing a beam of light through said dielectric liquid between said electrodes closely adjacent to one of said electrodes and spaced a substantially greater distance from the other of said electrodes and applying an electrical potential across said electrodes whereby said dielectric liquid is subjected to an electrical field having a voltage gradient of the order of 1,000 volts per millimeter, said field extending between the electrodes transversely of the path of the beam of light, the optical density of the dielectric liquid adjacent to the electrode faces being affected by said field, whereby the beam of light is shifted away from said adjacent electrode face in a direction parallel to the electric field.

7. A method of displacing a light beam in a predetermined direction, said method comprising the steps of disposing two electrodes in spaced relationship in a dielectric liquid, at least one of said electrodes being of non-planar configuration, passing a beam of light through said dielectric liquid between said electrodes closely adjacent to one of said electrodes and spaced a substantially greater distance from the other of said electrodes, and applying an electrical potential across said electrodes whereby said dielectric liquid is subjected to a non-homogeneous electrical field having a voltage gradient of the order of 1,000 volts per millimeter, said field extending between the electrodes transversely of the path of the beam of light, the optical density of the dielectric liquid adjacent to the electrode faces being affected by said field, whereby the beam of light is shifted away from said adjacent electrode face in a direction parallel to the electrical field.

References Cited in the file of this patent

UNITED STATES PATENTS

| | | |
|---|---|---|
| 1,770,535 | Sukumlyn | July 15, 1930 |
| 1,923,891 | Skaupy | Aug. 22, 1933 |